United States Patent [19]
Nelson et al.

[11] Patent Number: 6,099,778
[45] Date of Patent: Aug. 8, 2000

[54] PROCESS FOR PRODUCING PET ARTICLES WITH LOW ACETALDEHYDE

[75] Inventors: Gregory Wayne Nelson; Vincent Alvin Nicely; Sam Richard Turner, all of Kingsport, Tenn.

[73] Assignee: Eastman Chemical Company, Kingsport, Tenn.

[21] Appl. No.: 08/956,670

[22] Filed: Oct. 23, 1997

Related U.S. Application Data

[60] Provisional application No. 60/028,625, Oct. 28, 1996.

[51] Int. Cl.$^7$ .............................. B28B 3/20; C08F 20/00; C08F 6/00
[52] U.S. Cl. ...................... 264/176.1; 528/272; 528/275; 528/298; 528/302; 528/307; 528/308; 528/308.6; 528/481; 528/483; 528/486; 528/491; 528/492; 525/437; 525/444; 264/239; 264/328.1; 264/DIG. 64
[58] Field of Search ...................................... 528/272, 275, 528/298, 302, 307, 308, 308.6, 481, 483, 486, 491, 492; 525/437, 444; 264/176.1, 239, 328.1, DIG. 64

[56] References Cited

U.S. PATENT DOCUMENTS

| | | |
|---|---|---|
| 3,044,993 | 7/1962 | Gerke et al. . |
| 3,486,864 | 12/1969 | van der Schee et al. . |
| 3,619,145 | 11/1971 | Crawford et al. . |
| 3,913,796 | 10/1975 | Aoki . |
| 4,060,226 | 11/1977 | Schweller . |
| 4,093,593 | 6/1978 | Go . |
| 4,107,787 | 8/1978 | Ocker . |
| 4,330,661 | 5/1982 | Go . |
| 4,356,299 | 10/1982 | Cholod et al. . |
| 4,357,461 | 11/1982 | Go et al. . |
| 4,361,681 | 11/1982 | Bernhardt . |
| 4,362,852 | 12/1982 | Pendlebury et al. . |
| 4,403,090 | 9/1983 | Smith . |
| 4,424,337 | 1/1984 | Smith et al. . |
| 4,447,595 | 5/1984 | Smith et al. . |
| 4,675,378 | 6/1987 | Gibbon et al. . |
| 4,764,323 | 8/1988 | Al Ghatta . |
| 4,837,115 | 6/1989 | Igarashi et al. . |
| 5,049,647 | 9/1991 | Al-Ghatta . |
| 5,102,594 | 4/1992 | Burlet et al. . |
| 5,104,965 | 4/1992 | Jenkins et al. . |
| 5,243,020 | 9/1993 | Ghisolfi . |
| 5,250,333 | 10/1993 | McNeely et al. . |
| 5,258,233 | 11/1993 | Mills et al. . |
| 5,266,413 | 11/1993 | Mills et al. . |
| 5,597,891 | 1/1997 | Nelson et al. . |
| 5,648,032 | 7/1997 | Nelson et al. . |
| 5,656,221 | 8/1997 | Schumann et al. . |
| 5,656,719 | 8/1997 | Stibal et al. . |

FOREIGN PATENT DOCUMENTS

| | | |
|---|---|---|
| 0 717 061 | 6/1996 | European Pat. Off. . |
| 195 03 053 | 8/1996 | Germany . |
| WO 97/05186 | 2/1997 | WIPO . |
| WO 97/31968 | 9/1997 | WIPO . |

OTHER PUBLICATIONS

Japan Patent Application Sho 62–182065 (1987).

*Primary Examiner*—Samuel A. Acquah
*Attorney, Agent, or Firm*—Cheryl J. Tubach; Harry J. Gwinnell

[57] ABSTRACT

The present invention discloses a process for producing molded, shaped or extruded articles comprising the steps of:
  a) melt reacting, in the presence of a catalyst which is substantially free of Co compounds, at least one glycol and at least one dicarboxylic acid to form a polyester having an I.V. of at least about 0.5 dL/g, wherein said at least one glycol is selected from the group consisting of glycols having up to 10 carbon atoms and mixtures thereof and said dicarboxylic is selected from the group consisting of alkyl dicarboxylic acids having 2 to 16 carbon atoms, aryl dicarboxylic acids having 8 to 16 carbon atoms and mixtures thereof;
  b) adding an acetaldehyde reducing additive to said polyester to form a reduced acetaldehyde polyester; and
  c) forming said reduced acetaldehyde polyester into articles directly from step b.

Thus, the present invention provides a process for directly producing from the melt article having extremely low acetaldehyde content.

27 Claims, 1 Drawing Sheet

PROCESS FOR PRODUCING PET ARTICLES WITH LOW ACETALDEHYDE

This application is based upon and claims the priority of provisional application Ser. No. 60/028,625 filed Oct. 28, 1996.

BACKGROUND OF THE INVENTION

Polyesters are widely used in the manufacture of fibers, molded objects, films, sheeting, food trays, as well as food and beverage containers. These polymers are generally made by batch or continuous melt phase polycondensation reactions well known in the art. The polymers are then pelletized and used in various extrusion or molding operations. In certain applications where higher molecular weight polymers are required, the pellets are subjected to "solid state" polycondensation conditions in which the inherent viscosity (I.V.) value is significantly increased. Such solid state polycondensation reactions are used for two reasons. First, because the melt viscosity of polyester polymers is quite high for polymers having I.V. values greater than about 0.6, solid stating provides a convenient means to handle the polymer. Secondly, the solid stating process provides conditions conducive to removing unwanted volatile impurities such as acetaldehyde which is important in certain applications. Also, polyesters are well known to be degraded by small amounts of moisture when they are melt processed in conventional equipment. Consequently, polyesters are usually carefully dried to very low moisture levels in a drier prior to melt processing. The drying process may also remove some objectional volatile materials other than water.

During the preparation or processing of polyesters such as poly(ethylene terephthalate) (PET) certain byproducts are formed in the melt phase. One such byproduct is acetaldehyde, and its presence in molded objects such as food containers, beverage bottles, water bottles, and the like is quite deleterious from a taste standpoint. Particularly for sensitive beverages such as cola, beer, and water, it is highly desirable to produce container preforms for blow molding processes having less than about 10 ppm of acetaldehyde. Achieving this low level of acetaldehyde is difficult, however, because, as is well known to practitioners of the art, acetaldehyde is continually formed as a byproduct during the polymerization and subsequent melt processing of PET and similar polymers.

Before the discovery of the present invention, therefore, a four-stage process has been universally practiced to provide polyester polymers suitable for uses in which it is important to minimize the presence of acetaldehyde. Such a process typically involves the preparation of a relatively low molecular weight precursor polymer, having an I.V. value of about 0.3–0.6, by melt-phase polymerization techniques that are well known in the art. The acetaldehyde content of such a precursor may range from about 30 ppm to over 150 ppm, depending on the reaction conditions chosen. This precursor is then cooled, shaped into pellets, crystallized, and subjected to further solid-state polymerization at a lower temperature. Typically, a gas is used to strip glycols, acetaldehyde, and other reaction byproducts from the pellets so that at the end of the solid-state process, the I.V. value has been increased to about 0.75 or more, and the acetaldehyde content has been reduced to below about 1 ppm or less.

After solid stating, polyesters are commonly handled and stored in ambient air from which it absorbs moisture. Thus, as a third step, the polymer is usually dried immediately prior to reheating, melting and forming into a useful shape, such as a beverage bottle preform. The processing typically causes a small decrease in the I.V. of the polymer and an increase in acetaldehyde content of from less than 1 ppm in the pellets, to up to about 8 or 10 ppm or more in the shaped article. This dramatic increase in acetaldehyde occurs despite the fact that the molding process takes typically less than one or two minutes to complete.

U.S. Pat. Nos. U.S. 5,266,413, U.S. 5,258,233 and U.S. 4,8837,115 disclose various polyamides which are useful in reducing the acetaldehyde levels in PET. U.S. application Ser. No. 595,460, filed Feb. 5, 1996 discloses novel polyesteramide compositions which reduce the levels of acetaldehyde in PET.

Japan Patent Application Sho 62-182065 (1987) discloses blending nylon 6 and other aliphatic polyamides into PET to reduce the acetaldehyde levels below 10 ppm when residence times in the melt are kept below 60 seconds.

Several other compounds have also been disclosed to be useful in reducing acetaldehyde. These include ethylenediaminetetraacetic acid (U.S. Pat. No. 4,357,461), alkoxylated polyol (U.S. Pat. No. 5,250,333), bis(4-β-hydroxyethoxyphenyl) sulfone (U.S. Pat. No. 4,330,661), zeolite compounds (U.S. Pat. No. 5,104,965), 5-hydroxyisophthalic acid (U.S. Pat. No. 4,093,593), poly (ethylene isophthalate) (U.S. Pat. No. 4,403,090) and super-critical carbon dioxide (U.S. Pat. No. 5,049,647 and U.S. Pat. No. 4,764,323) and protonic acid catalysts (U.S. Pat. No. 4,447,595 and U.S. Pat. No. 4,424,337).

U.S. Pat. No. 4,361,681 discloses that the capping of hydroxyl end groups of PET with anhydrides such as succinic or phthalic acid anhydride will suppress acetaldehyde formation. U.S. Pat. No. 5,243,020 discloses pyromellitic dianhydride for end capping of PET.

U.S. Pat. No. 4,356,299 discloses that the use of catalysts based on low levels of Ti and Sb are beneficial in limiting the amount of acetaldehyde formed.

U.S. Pat. No. 5,656,719 discloses the production of molded polyesters articles having low acetaldehyde via melt polymerization and a post condensation reactor. The post condensation reactor is operated at low vacuum levels and significant residence times to build up inherent viscosity.

U.S. Pat. No. 5,656,221 discloses the production of molded polyesters articles having low acetaldehyde via addition of an acetaldehyde reducing additive and molding directly from melt polymerization. Cobalt compounds in addition to conventional polymerization catalysts are required in amounts from 5 to 120 ppm.

Integrated processes which produce PET articles with low acetaldehyde but do not disclose the addition of acetaldehyde reducing additives have also been disclosed. U.S. application Ser. No. 609,197 describes a process for direct molding of polyester from the melt. U.S. application Ser. No. 498,404 discloses a process and apparatus for distributing molten PET to a multiplicity of molding machines. U.S. Pat. No. 5,648,032 describes processes for making low acetaldehyde poly(ethylene terephthalate) articles without using solid stated polymer.

Several patents disclose the use of vented extruders to devolatilize polymers. U.S. Pat. No. 5,597,891 discloses a process for producing reduced acetaldehyde polyester articles by using a purge gas in a vented extruder to remove acetaldehyde. U.S. Pat. No. 5,102,594 discloses thermoplastic condensation polymer supplied to extruder in powder form to a vented extruder). U.S. Pat. No. 3,486,864 discloses using a vacuum to remove volatile glycol products from a remelted prepolymer as fast as possible. U.S. Pat. No.

3,913,796 discloses using an extrusion screw for heating the solid resin to a semi-molten state and U.S. Pat. No. 4,060, 226 disclose excluding oxygen by means of a check valve.

SUMMARY OF THE PRESENT INVENTION

Figure 1:
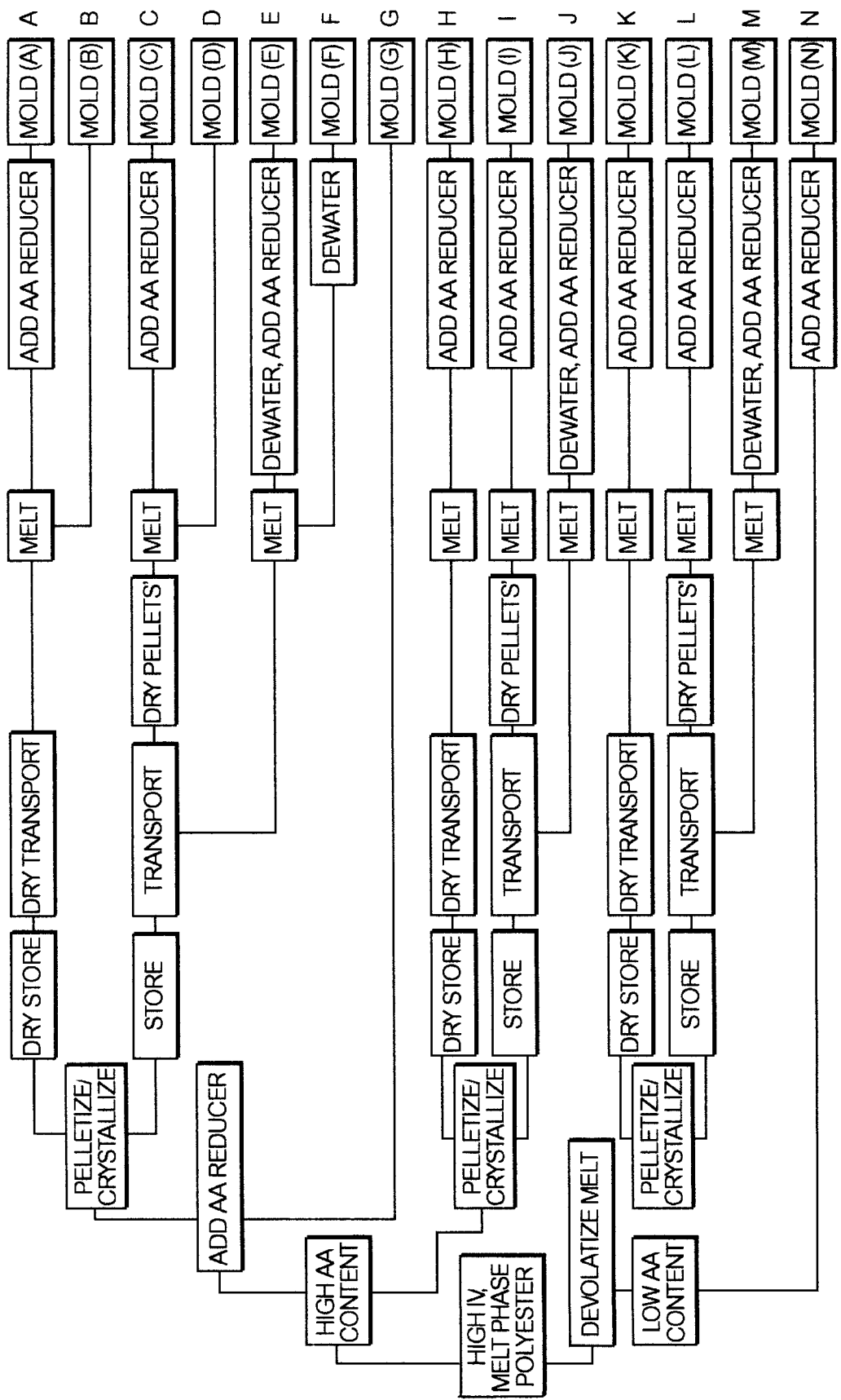
FIG. 1 is a flow diagram showing several potential embodiments of the process of the present invention.

The present invention includes a process whereby low acetaldehyde polyesters such as PET and similar polymers may be prepared and used without need for the solid stating process nor the usual drying of solid pellets. Surprisingly the present invention is accomplished without the need for Co compound catalysts or a post condensation reactor.

Specifically the present invention includes a process for producing molded articles comprising the steps of:

a) melt reacting at least one glycol and at least one dicarboxylic acid to form a polyester having an I.V. of at least about 0.5 dL/g, wherein said at least one glycol is selected from the group consisting of glycols having up to 10 carbon atoms and mixtures thereof and said dicarboxylic is selected from the group consisting of alkyl dicarboxylic acids having 2 to 16 carbon atoms, aryl dicarboxylic acids having 8 to 16 carbon atoms and mixtures thereof in the presence of a catalyst which is substantially free from Co compounds;

b) adding an acetaldehyde reducing additive to said polyester to form a reduced acetaldehyde polyester; and c) forming said reduced acetaldehyde polyester into shaped articles directly from step b.

Additionally several optional steps such as melt devolatilizating, pelletizing, storing, transporting, remelting, and drying, may be included to fit the needs of a specific process. If the polymer is pelletized the acetaldehyde reducing additive may be added prior to pelletization or after remelting. The shaped articles made from the process of the present invention display surprisingly low acetaldehyde content.

DESCRIPTION OF THE INVENTION

As used herein the term "I.V." refers to the Inherent Viscosity of the polymer, as determined on a solution of 0.5 gm of polymer dissolved in 100 ml of a mixture of phenol (60% by volume) and tetrachloroethane (40% by volume).

The present invention provides a process to make shaped articles from polymers which display both high molecular weight and low acetaldehyde content without requiring the use of solid-state polymerization, solid-state devolatilization or a post condensation reactor.

Specifically, a preferred embodiment of the process of the present invention provides an improved "melt-to-mold" process in which polyester polymers or copolymers are prepared in the melt phase to an I.V. value of greater than about 0.5 dL/g; an acetaldehyde reducing additive is added to the polymer melt and then the melt is fed directly from the polycondensation reactor to at least one molding or shaping machine. No intervening post condensation or I.V. build up is required.

Any conventional melt polymerization process capable of producing the required I.V. may be used for the polycondensation and the reactor may comprise one or more reaction vessels or zones which are capable of producing polyester having the required I.V.

Preferably the I.V. is at least about 0.65 dL/g so the polymer directly from the melt has sufficient molecular weight to provide high performance molded articles such as containers. In the present invention, the desired I.V. is generated in the polycondensation reaction and no post condensation reactor is necessary.

Generally the melt polymerization is conducted under conditions which are known in the art, however, for the present invention Co compounds are not added.

The AA reducing additive may be any additive known to reduce AA. Suitable additives include polyamides such as those disclosed in U.S. Pat. Nos. U.S. 5,266,413, U.S. 5,258,233 and U.S. 4,8837,115; polyesteramides such as those disclosed in U.S. application Ser. No. 595,460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250,333), bis(4-β-hydroxyethoxyphenyl)sulfone (U.S. Pat. No. 4,330, 661), zeolite compounds (U.S. Pat. No. 5,104,965), 5-hydroxyisophthalic acid (U.S. Pat. No. 4,093,593), poly (ethylene isophthalate) (U.S. Pat. No. 4,403,090), supercritical carbon dioxide (U.S. Pat. No. 5,049,647 and U.S. Pat. No. 4,764,323) and protonic acid catalysts (U.S. Pat. No. 4,447,595 and U.S. Pat. No. 4,424,337). Preferably the AA reducing additive is selected from polyamides, polyesteramides and poly(ethylene isophthalate). Suitable polyamides include homo and copolyamides with AB or $A_2B_2$ structures such as poly(caprolactam), poly(hexamethyleneadipamide), poly(m-xylylene-adipamide), etc. Branched or hyperbranched polyamides can also be used.

Suitable poyesteramides include the polyesteramides prepared from terephthalic acid, 1,4-cyclohexane-dimethanol, isophthalic acid and hexamethylene diamine (preferably with about 50:50 ratio of the diacids and a 50:50 ratio of the glycol to the diamine); the polyesteramide prepared from terephthalic acid, 1,4-cyclohexanedimethanol, adipic acid and hexamethylene diamine; the polyesteramides prepared from terephthalic acid, 1,4-cylcohexanedimethanol and bis (p-amino-cylcohexy)methane. Other known scavengers such as polyethyleneimine may also be used.

The AA reducing additive is generally added in an amount between about 0.1 and 5 weight %. More preferably between about 0.2 and 3 weight % additive is added. It should be understood that the additive may be added individually or as a concentrate in a compatible polymer base resin.

Devolatilization of the polymer may also be used in conjunction with the AA reducing additive to further remove acetaldehyde and other undesirable volatiles which are generated. The devolatilization step may be conducted in a separate devolatilization unit, concurrently in the polycondensation reactor, or concurrently in molding machine.

The devolatilization device can be any apparatus known in the art for generating a large amount of surface area per unit volume and\or for rapidly regenerating the exposed melt surface. The devolatilization device should subject the liquid surface to a low partial pressure of acetaldehyde either by inert gas purging as described in U.S. Pat. No. 5,597,891, applied vacuum or both. The devolatilization apparatus may be a vented single-screw extruder (U.S. Pat. No. 4,107,787), a vented twin-screw extruder (U.S. Pat. No. 3,619,145), a rotating disk processor (U.S. Pat. No. 4,362,852), or device which generates thin strands of polymer (U.S. Pat. No. 3,044,993), all of which are incorporated herein by reference. The devolatilization step of the present invention is conducted at pressures which are greater than about 25 mm Hg, and preferably less than or near atmospheric pressures. Residence times should be short enough to insure that substantial increases in I.V. are not encountered. For the purposes of this invention a substantial increase in I.V. is an increase greater than about 0.1 dl/g, preferably greater than about 0.05 dl/g and more preferably greater than about 0.03 dl/g.

Several additional optional steps may also be added to the process of the present invention. These steps include: melt devolatilization, pelletizing, storage and transportation, remelting and drying. It should be appreciated that the optional steps may be used alone (i.e. devolatilization) or in combination with each other (pelletizing and remelting, or storage, transportation and remelting, etc.). Suitable combinations of the optional steps are well known in the art and need not be individually detailed here.

FIG. 1 illustrates many possible combinations of the operations in going from a high molecular weight melt phase polymer to molded articles. A preferred combination of operations is illustrated in FIG. 1 as the Path G and would be to prepare the polymer in the melt to the desired I.V., add the additives and form the improved polymer melt into useful shaped articles, such as for example beverage bottle preforms, said shaped articles having surprisingly low acetaldehyde content.

A second combination of operations illustrated in FIG. 1 as Path N would be to prepare the polymer in the melt to the desired I.V., devolatilize the melt to lower the acetaldehyde somewhat and add the AA reducing additive to further reduce the acetaldehyde and then form the improved polymer melt into useful shaped articles. The other paths illustrated in FIG. 1 show other combinations of operations all of which lead to the desired end of having formed articles containing desirably low acetaldehyde levels starting from melt-phase, high molecular weight polymer and without having to solid-state polymerize the polymer. Not only does the process of the present invention avoid the costly additional steps of the conventional process of solid-state polymerization, but the shaped articles produced thereby possess both low AA content and other superior properties such as, for example, less loss of molecular weight due to breakdown, and freedom from defects known as "bubbles" and "unmelts" which are sometimes formed during the molding of solid stated materials from the conventional process.

The molding or shaping device may be any of those generally known in the art. For example, injection molds may be used to form preforms used to blow bottles, food/beverage containers, trays, or other desirable shapes. Also the polymer melts may be used in extrusion blow molding operations to provide bottles, food containers, and the like. The polymer melt may similarly be fed to an extruder to produce films, sheet, profiles, pipe and the like.

The combinations of operations illustrated in FIG. 1 is not intended to be limiting because it is obvious that other operations might be added and the sequence of some operations might be changed and still achieve the same ends.

If the pelletization of the polymer is desired as an intermediate process, then one must deal with any moisture absorbed by the polymer. Polyesters are well known by those who practice the art to be degraded by moisture present during conventional melt processing. The usual method of removing the moisture is to crystallize the polymer to minimize sticking of the pellets to each other and then to hold it at a temperature high enough to remove the vaporized moisture. In order to have a more economical process, either one or a combination of both of the following methods may be used to provide a molten polymer free from degradation by moisture. The polyester is often extruded into a water bath to cool it so cutters can chop it in to pellets. One may use a dewatering process immediately following the chopping to completely remove the surface moisture prior to transferring the polymer to storage. Such dewatering equipment is sold, for example, by Gala Industries, Inc. of Eagle Rock, Vir. When the storage facility is blanketed or purged with a dry gas, the polymer will remain dry until use. Because the polymer is kept dry, there is no need for crystallization or drying. If the polymer is not kept dry so that it is amorphous and contains moisture, it may be fed to an extruder in which the melting zone is either purged with a gas or subjected to a vacuum. As the polymer heats and begins to melt, the high vapor pressure of the water causes it to separate into the vapor space. To minimize problems caused by foaming, it is preferred to use a machine that removes much of the moisture through an ambient pressure purge of the melting zone followed by a short residence time vacuum devolatilization in a second zone which is isolated by melt dams caused by the design and operation of the extruder as is commonly done by those skilled in the polymer extrusion art.

During the melt drying, some other volatile materials will be removed in addition to removing water. However, because of the low levels of acetaldehyde desired for articles to be used in contact with food, usually additional devolatilization steps or the additives to reduce acetaldehyde will be desired to produce a polymer melt of the desired quality.

In some cases it may be desirable to remove part of the acetaldehyde by a devolatilization process as illustrated in Paths K–N. Acetaldehyde can be readily removed from the molten polymer in the extruder or gear pump equipment by purging it with a gas or by subjecting the melt to conditions of vacuum. Typical acetaldehyde levels in polymer coming from the final reactor before this treatment are generally in the range of about 30–300 ppm for polyester of I.V.= 0.4–0.65 made by any of the known processes, followed by polymer filtration to remove gels and particulate matter, followed by another polycondensation reactor to produce high-viscosity polyesters of I.V.>0.68. The melt may be devolatilized, have additives mixed and used directly or it may be pelletized for later use. After the polymer is pelletized it will be an amorphous material containing the acetaldehyde that was in the melt. After remelting with drying, most of that acetaldehyde will remain to be removed by the use of additives and further devolitalization.

Suitable melt processing temperatures for poly(ethylene terephthalate) polymers will generally be in the range of about 260 to about 310° C. In the cases where polymer is never solidified, the melt temperatures can be kept toward the lower end of the range. The lower temperature is well known to assist in reducing acetaldehyde. One advantage of the present process is that because the pellets of polymer are amorphous, they may be processed at somewhat lower temperatures than is commonly used to melt solid stated crystalline pellets. Of course, processing temperatures may be adjusted for other types of polyesters depending on the melting point, I.V. value and the like.

The process of the present invention is less expensive to operate than making crystalline, solid-stated polymer, provides energy savings and lower capital requirements over conventional processes, and produces parisons and molded objects with better clarity, significantly fewer or no unmelts or other defects and lower concentrations of undesirable byproducts.

Polymers that are particularly useful in this process include poly(ethylene terephthalate), poly(ethylene naphthalenedicarboxylate), and copolyesters containing up to about 50 mole % of modifying dibasic acids and/or glycols. Modifying dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like. More preferably the polyesters of the present invention contain at least about 80 mole % terephthalic acid, naphthalenedicarboxylic acid or a mixture thereof.

Highly useful naphthalene dicarboxylic acids include the 2,6-, 1,4-, 1,5-, or 2,7- isomers but the 1,2-, 1,3-, 1,6-, 1,7-, 1,8-, 2,3-, 2,4-, 2,5-, and/or 2,8-isomers may also be used. The dibasic acids may be used in acid form or as their esters such as the dimethyl esters for example.

Typical modifying glycols may contain from about 3 to about 10 carbon atoms and include propylene glycol, 1,3-propanediol, 1,4-butanediol, 1,6-hexanediol, diethylene glycol, 1,4-cyclohexanediol, 1,4-cyclohexanedimethanol, and the like. The 1,4-cyclohexanedimethanol may be in the cis or the trans form or as cis/trans mixtures. More preferably the polyesters of the present invention comprise at least about 80 mole % ethylene glycol.

Particularly preferred polyesters comprise terephthalic acid and a mixture of about 60 to about 99 mole % ethylene glycol and about 40 to about 1 mole % cyclohexanedimethanol.

Generally the polyesters produced in the first step of the present invention have I.V.'s which are at least about 0.5 dL/g, more preferably at least about 0.65 dL/g and most preferably between about 0.65 and about 0.85 dL/g.

The polyesters of this invention are readily prepared using polycondensation reaction conditions well known in the art. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus compounds and toners as disclosed in U.S. Pat. No. 5,384,377 and U.S. Pat. No. 5,372,864, which is incorporated herein by reference may also optionally be present. Although we prefer to use continuous polycondensation reactors, batch reactors operated in series may also be used.

Although we prefer to use the polyesters in this process in an unmodified form, other components such as nucleating agents, branching agents, colorants, pigments, fillers, antioxidants, ultraviolet light and heat stabilizers, impact modifiers and the like may be used if desired.

EXAMPLES

Determination of acetaldehyde concentration in polyethylene terephthalate (PET)

PET samples were dried and extruded as described in the example below, and collected on dry ice to quench the melt. The polymer was immediately chopped into pellets and stored at −40° C for no longer than 2 days prior to AA analysis. The stored samples were ground in a Wiley mill to pass a 20 mesh screen. For the analysis a 0.5 g sample was placed into a sample tube that was immediately sealed. The sample was analyzed by dynamic headspace gas chromatographic analysis using a Hewlett-Packard 5890 Gas Chromatograph with a Perkin Elmer Automatic Thermal Desorption ATD-50 as the injection system. Acetaldehyde was desorbed by heating the sample at 150° C. for ten minutes. A standard PET level was established by grinding the extruded PET and subjecting it to the same test.

I.V.

I.V. was measured by standard methods at 25° C. at a concentration of 5 g/L in a phenol/tetrachlorethane solution (60/40 wt/wt).

Composition used

The PET used in the examples is a copolyester consisting of 100 mole percent of terephthalic acid, 98 to 99 mole percent ethylene glycol and 1 to 2 mol percent 1,4-cyclohexanedimethanol, having an I.V. of about 0.74. The PET was pelletized prior to feeding it to a vented twin-screw extruder.

Simulated high AA samples were produced as follows: Granulated PET was placed in a container and an appropriate amount of liquid acetaldehyde was added. The container was sealed and the contents were allowed to equilibrate at room temperature for 1 day before use in the additive experiments.

The PET/additive blends were prepared by batch-wise dry mixing in a bag prior to feeding into the extruder. The additives where added at the level shown in Table 1.

Additive 1 is a high molecular weight (Mw=38,200) polyesteramide prepared from terephthalic acid, cyclohexanedimethanol, and hexamethylene diamine with a 50/50 molar ratio of the diol and diamine.

Additive 2 is a low molecular weight (Mw=17,800) polyesteramide prepared from terephthalic acid, cyclohexanedimethanol, and hexamethylene diamine with a 50/50 molar ratio of the diol and diamine.

Additive 3 is a polyamide prepared from adipic acid and m-xylyenediamine.

Examples 1–12

The polymer/additive compositions shown in Table 1, below were fed to a vented twin screw extruder in a metered fashion. The extruder screw RPMs were maintained at 30. Zone 1 of the extruder, following the water-cooled feed zone, was set to 265° C. Zones 2 and 3, the heated extruder vented area, were controlled at 272.5° C. The final zone, Zone 4, was between the vent and the discharge port and was kept at 260° C. For gas sweep examples, nitrogen preheated to 285° C. was used and was fed through the extruder vent so as to sweep over the polymer melt. The gas flow was controlled at 250 sccm by a mass flow controller and vented to atmospheric pressure through a bubble trap. The non-swept examples had the gas flow turned off, but were still allowed to vent to atmospheric pressure via the bubble trap. The residence time of the molten polymer in the extruder after venting was 3 minutes. Examples 1–12 in Table 1 are the examples of this invention demonstrating the exceptional acetaldehyde reducing capability of the various additives in this extrusion process. For each of these examples, the extruded polymer was formed into rods.

TABLE 1

Examples of the Effect of Additives on AA Levels

| Ex # | Precrsr I.V. (dL/g) | Precrsr AA Content (ppm) | Additive | $N_2$ sweep (sccm) | Extrdte AA (ppm) | Extrdte I.V. (dL/g) |
|---|---|---|---|---|---|---|
| 1 | 0.74 | 2 | none | 0 | 4.9 | 0.61 |
| 2 | 0.74 | 2 | none | 250 | 2.7 | 0.7 |
| 3 | 0.74 | 2 | A1 (1 wt %) | 0 | 1.7 | 0.62 |
| 4 | 0.74 | 2 | A1 (1 wt %) | 250 | 0.5 | 0.68 |
| 5 | 0.74 | 176 | none | 0 | 52 | 0.64 |
| 6 | 0.74 | 176 | none | 250 | 10 | 0.73 |
| 7 | 0.74 | 176 | A1 (1 wt %) | 0 | 18 | 0.63 |
| 8 | 0.74 | 176 | A1 (1 wt %) | 250 | 1 | 0.7 |

TABLE 1-continued

Examples of the Effect of Additives on AA Levels

| Ex # | Precrsr I.V. (dL/g) | Precrsr AA Content (ppm) | Additive | N₂ sweep (sccm) | Extrdte AA (ppm) | Extrdte I.V. (dL/g) |
|---|---|---|---|---|---|---|
| 9 | 0.74 | 176 | A2 (1 wt %) | 0 | 26 | 0.66 |
| 10 | 0.74 | 176 | A2 (1 wt %) | 250 | 1.6 | 0.7 |
| 11 | 0.74 | 176 | A3 (0.5 wt %) | 0 | 14 | 0.64 |
| 12 | 0.74 | 176 | A3 (0.5 wt %) | 250 | 1.4 | 0.72 |

Significantly lower AA levels were achieved when an additive was used in combination with a nitrogen sweep. Residence time (not shown) in the extruder was sufficient to achieve a significant increase in I.V. (0.04–0.09) compared to controls when using a nitrogen purge. The I.V. increase is due to a lowering of the ethylene glycol partial pressure, resulting in further polycondensation and a higher molecular weight of the polymer.

We claim:

1. A process comprising the steps of:
   (a) melt reacting, in the presence of a catalyst which is substantially free of Co compounds, at least one glycol and at least one dicarboxylic acid to form a polyester having an I.V. of at least about 0.5 dL/g, wherein said at least one glycol is selected from the group consisting of glycols having up to 10 carbon atoms and mixtures thereof and said dicarboxylic is selected from the group consisting of alkyl dicarboxylic acids having 2 to 16 carbon atoms and mixtures thereof;
   (b) adding an acetaldehyde reducing additive to said polyester and thereafter devolatilizing said polyester to form a reduced acetaldehyde polyester; and
   (c) forming said reduced acetaldehyde polyester into articles directly from step (b).

2. The process of claim 1 wherein said polyester from step a has an I.V. of at least about 0.65 dL/g.

3. The process of claim 1 wherein said polyester from step (a) has an I.V. between about 0.65 and about 0.85 dL/g.

4. The process according to claim 1 wherein said dicarboxylic acid comprises at least about 80% mole terephthalic acid.

5. The process of claim 1 wherein said dicarboxylic acid comprises at least about 80% mole naphthalenedicarboxylic acid.

6. The process of claim 1 wherein said glycol comprises at least 80 mole % ethylene glycol.

7. The process of claim 1 wherein said glycol is a mixture of ethylene glycol and cyclohexanedimethanol.

8. The process of claim 1 wherein said acetaldehyde reducing additive is selected from the group consisting of polyamides, polyesteramides, nylon-6, aliphatic polyamides, ethylenediaminetetraacetic acid, alkoxylated polyols, bis(4-β-hydroxyethoxyphenyl)sulfone, zeolite compounds, 5-hydroxyisophthalic acid, poly(ethylene isophthalate), supercritical carbon dioxide, protonic acid catalysts and mixtures thereof.

9. The process of claim 1 wherein said acetaldehyde reducing additive is selected from the group consisting of polyamides, polyesteramides and poly(ethylene isophthalate).

10. The process of claim 9 wherein said polyamides are selected from the group consisting of homo and copolyamides with AB or A₂B₂ structures.

11. The process of claim 10 wherein said polyamides are selected from the group consisting of poly(caprolactam), poly(hexamethylene-adipamide), poly(m-xylylene-adipamide) and mixtures thereof.

12. The process of claim 10 wherein said polyesteramides are selected from the group consisting of polyethyleneimine, poyesteramides prepared from terephthalic acid, 1,4-cyclohexanedimethanol, isophthalic acid and hexamethylene diamine; the polyesteramide prepared from terephthalic acid, 1,4-cyclohexanedimethanol, adipic acid and hexamethylene diamine; the polyesteramides prepared from terephthalic acid, 1,4-cylcohexanedimethanol and bis(p-aminocylcohexy)methane and mixtures thereof.

13. The process of claim 1 wherein said acetaldehyde reducing additive is added in an amount between about 0.1 and 5 weight %.

14. The process of claim 1 wherein said acetaldehyde reducing additive is added in an amount between about 0.2 and 3 weight % additive is added.

15. The process of claim 1 wherein said dicarboxylic acid comprises terephthalic acid and said glycol is a mixture of about 60 to about 99 mol % ethylene glycol and about 40 to about 1 mol % cyclohexanedimethanol.

16. The process of claim 1 wherein reacting and devolatilizing steps are conducted in a single piece of equipment.

17. The process of claim 1 wherein said acetaldehyde reducing additive is added to said polyester individually.

18. The process of claim 1 wherein said acetaldehyde reducing additive is added to said polyester as part of a concentrate.

19. The process of claim 1 wherein at least one toner is added to said melt reacting step a).

20. The process of claim 1 wherein said devolatilizing is conducted at pressures which are greater than about 25 mm Hg.

21. The process of claim 1 wherein said devolatilizing is conducted at pressures which are near or at atmospheric pressures.

22. The process of claim 1 wherein said devolatilizing is conducted at residence times such that a substantial increase in I.V. is not achieved.

23. The process of claim 22 wherein said substantial increase is greater than about 0.1 dl/g.

24. The process of claim 22 wherein said substantial increase is greater than about 0.05 dl/g.

25. The process of claim 22 wherein said substantial increase is greater than about 0.03 dl/g.

26. The process of claim 1 wherein said polyester has an acetaldehyde content of less than about 10 ppm.

27. An article which is formed according to the process of claim 1 selected from the group consisting of molded, shaped and extruded articles.

* * * * *

UNITED STATES PATENT AND TRADEMARK OFFICE
CERTIFICATE OF CORRECTION

PATENT NO : 6,099,778
DATED : August 8, 2000
INVENTOR(S) : Gregory W. Nelson, *et al.*

It is certified that error appears in the above-identified patent and that said Letters Patent are hereby corrected as shown below:

Title page, column 2, "Attorney, Agent, or Firm," change "Cheryl J. Tubach" to --Karen A. Harding--.

Claim 12, line 10, change "poyesteramides" to read --polyesteramides--.

Signed and Sealed this

Seventeenth Day of April, 2001

Attest:

NICHOLAS P. GODICI

*Attesting Officer*  *Acting Director of the United States Patent and Trademark Office*